US012619092B2

(12) United States Patent
    Oriach Font

(10) Patent No.: US 12,619,092 B2
(45) Date of Patent: May 5, 2026

(54) SPECTRAL SPLITTER DEVICE

(71) Applicant: MONOCROM, S.L., Vilanova I la Geltru (ES)

(72) Inventor: Carles Oriach Font, Vilanova I la Geltru (ES)

( * ) Notice: Subject to any disclaimer, the term of this patent is extended or adjusted under 35 U.S.C. 154(b) by 602 days.

(21) Appl. No.: 18/001,134

(22) PCT Filed: Dec. 29, 2020

(86) PCT No.: PCT/ES2020/070827
    § 371 (c)(1),
    (2) Date: Dec. 8, 2022

(87) PCT Pub. No.: WO2022/144472
    PCT Pub. Date: Jul. 7, 2022

(65) Prior Publication Data
    US 2023/0213778 A1      Jul. 6, 2023

(51) Int. Cl.
    *G02B 27/28*          (2006.01)
(52) U.S. Cl.
    CPC .................................. *G02B 27/283* (2013.01)
(58) Field of Classification Search
    CPC .................................................. G02B 27/283
    USPC ........................................................ 359/489
    See application file for complete search history.

(56) References Cited

U.S. PATENT DOCUMENTS

| | | |
|---|---|---|
| 2002/0163691 A1 | 11/2002 | Wong et al. |
| 2011/0299162 A1 | 12/2011 | Chen et al. |

FOREIGN PATENT DOCUMENTS

| | | |
|---|---|---|
| CA | 2359604 A1 | 7/2002 |
| CN | 105005151 B | 6/2018 |
| WO | 2003091765 A1 | 6/2003 |

OTHER PUBLICATIONS

International Search Report for corresponding PCT/ES2020/070827, dated Sep. 23, 2021.
Written Opinion of the International Searching Authority for corresponding PCT/ES2020/070827, dated Sep. 23, 2021.

*Primary Examiner* — Bumsuk Won
*Assistant Examiner* — Grant A Gagnon
(74) *Attorney, Agent, or Firm* — Egbert, McDaniel & Swartz, PLLC

(57)          ABSTRACT

Disclosed is a spectral splitter device for transforming at least one initial light beam coming from a light source into more than two light beams, or vice versa, which includes: a first polarising beam splitter that splits the initial light beam into two orthogonally polarised beams; two optical elements respectively penetrated by the two orthogonally polarised beams; and a second polarising beam splitter and a third polarising beam splitter which split the two orthogonally polarised light beams into four respective output beams. Each of the two optical elements is birefringent and their birefringence depends on wavelength.

19 Claims, 5 Drawing Sheets

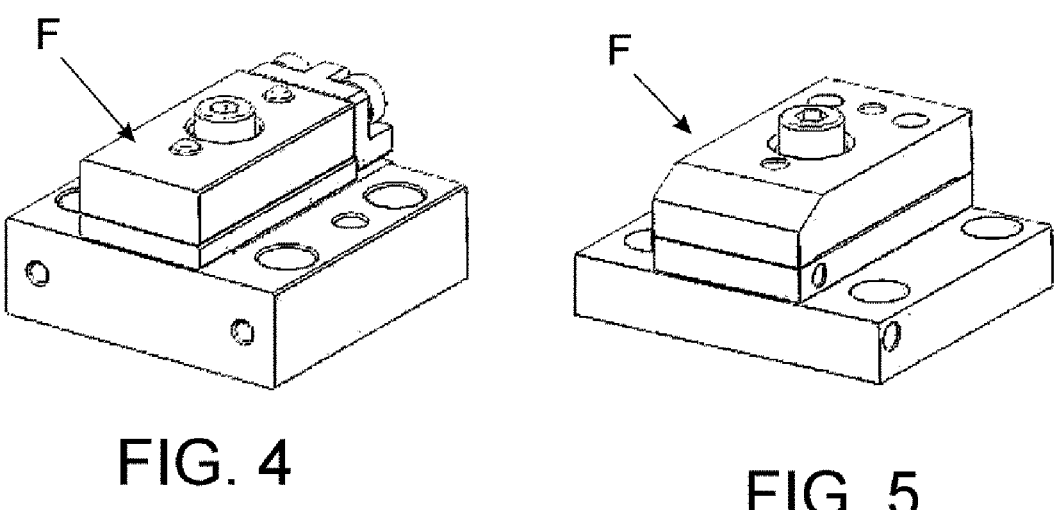
FIG. 4
FIG. 5
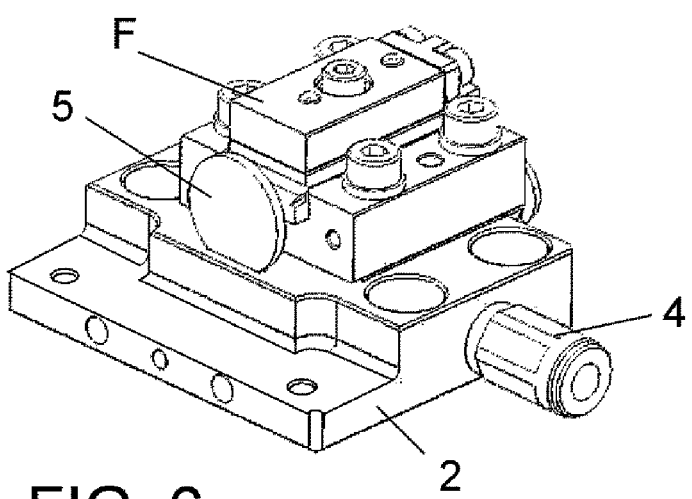
FIG. 6
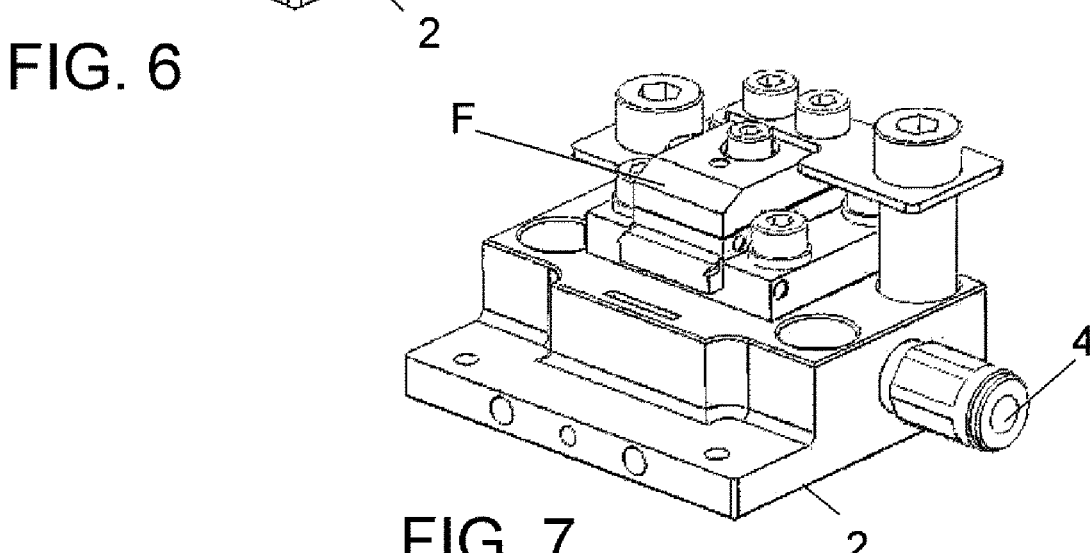
FIG. 7

SPECTRAL SPLITTER DEVICE

OBJECT OF THE INVENTION

The invention, as expressed in the wording of the present description, refers to a spectral splitter device that provides advantages and features, described in detail below, which represent an improvement of the current state of the art within its field of application.

More particularly, the object of the invention is centered on a spectral splitter device which, based on the principle of a Lyot filter, allows an increase in the power density of a light source beam, for example a laser, from the linear superposition of two pairs of beams combined by orthogonal polarization, through the use of birefringent and/or dispersive optical elements, for example calcite crystal with the necessary thickness to modify the wavelength in a controlled manner, causing both beams to have the same polarization and thus allowing their linear superposition, which, in turn, allows a cascade repetition of the process, combining again the linearly superimposed beams with other beams subjected to the same effect, and where the equipment comprises an optical assembly plate to be able to accomplish said effect by including additional elements, such as an external resonator that provides a greater cavity and a specific resonance condition, depending on each need, on the output beam obtained.

FIELD OF APPLICATION OF THE INVENTION

The field of application of the present invention is framed within the sector of the industry dedicated to the manufacture of devices and components for light emitting equipment, for example laser, LED or other technologies.

BACKGROUND OF THE INVENTION

As is known, when light passes through a birefringent medium, the beam can be broken down into two polarization components with respect to the optical axis of the medium, each of which experiences different refractive indices, resulting in a relative phase shift between the two and thus can induce a change in the polarization state of the light. Since all mediums are dispersive, therefore having different refractive indices for different wavelengths, birefringence is generally also dispersive. Therefore, the change in the polarization state depends on the wavelength. Therefore, it is possible to distinguish, filter, separate or combine different spectral components of light by suitable configurations of birefringent materials and polarization beam splitters. In the simplest case, a birefringent crystal is placed between two polarizers. This filter is known as a Lyot filter. As a phase delay between the polarization states of light is periodic by multiples of $\pi$, so is the periodic transmission of the filter with respect to the wavelength.

This effect can be very practical for power boosting in certain equipment.

For example, laser technology is widely used in industry, usually for use in industrial laser processes, mainly for cutting or welding. Most are made with fiber optic lasers or disk lasers.

In any case, what is important in these types of applications is to have energy density that can be concentrated in very small spots. Energy density is achieved by scaling power or decreasing the laser spot size.

However, in applications with diodes, all the increase in density is based on the increase in power, since the spot cannot be made smaller owing to the low beam quality in the slow axis, but to date, laser state of the art to increase its power/capacity only allows adding two-diode beams by means of polarization or several per wavelength. Therefore, the development of a new technique that allows an increase in said power by adding more than said two single diodes is desirable, with the aim of the present invention being the development of said new technique that allows an energy density two or four times higher in a simple way.

In the current state of the art, to combine two laser beams of two diodes, the two diodes are combined, which are equal and are placed perpendicularly and focused, with different light polarizations (a vertical polarization and another polarization turned horizontally by means of a wave retarder interposed for this purpose), facing a polarization beam splitter, so that they reach the polarization beam splitter and leave united in the same direction, since one passes through the polarization beam splitter and the other is reflected, but maintaining their different polarizations. This means that the combination of both beams cannot be re-combined to increase the power of the output laser, which would be desirable.

Each laser consists of a laser active region, also called gain region, in which the energy supplied is converted by stimulated emission into coherent radiation. For this purpose, a laser resonator is needed to ensure that a part of the emerging radiation is returned to the gain region. It therefore contains at least one feedback element, typically a semi-transparent mirror. This resonator determines, by its geometry and physical properties, the feedback characteristics of the laser light, in particular the spatial profile, wavelength, bandwidth and polarization.

The estimated achievable characteristics depend on the material gain and resonators and, in general, are inversely correlated with each other and have an achievable output power. Improvements in one chosen parameter thus tend to deteriorate other parameters.

Of particular practical importance are semiconductor lasers, as they are minute, directly convert electrical energy into light, are extremely efficient and can be manufactured using established semiconductor production technology techniques and are, therefore, inexpensive in large quantities. The resonator is integrated in tandem by reflective layers that are applied to the end faces and/or refractive index gratings that are incorporated epitaxially. Currently, the output power or achievable power density is still too low for many interesting applications. This is because light is generated in volumes that are significantly smaller than 1 $mm^3$ and, therefore, lead to power densities that would destroy the component when further increased.

Increasing the volume is not a solution because the modal selectivity decreases and, as a result, the beam quality deteriorates, which keeps the power density approximately constant.

A long-practiced approach to at least double the output power consists in superimposing two orthogonal laser polarizations using a polarization beam splitter, as explained above, such that the resulting light contains cross-polarizations and can only be increased to such double power.

The aim of the present invention is, therefore, to develop a spectral splitter device to increase the power and, therefore, the efficiency of the use of light beams in multiple industrial applications, for example in laser devices to significantly increase said power by combining pairs of laser beams, allowing an exponential increase of the same, depending on the number of pairs that are combined.

Moreover, and as a reference to the current state of the art, it should be noted that although documents and literature disclosing concepts in this field are known, at least by the applicant, it is considered that none of them, taken separately or combined, discloses a device such as the one described herein or one with the technical, structural and constitutive characteristics equal or similar to those presented by the device claimed herein.

In that regard, it is worth mentioning that (for example from WO 03/055018) it is known that highly compact external resonators can dramatically improve the beam quality of high power diode lasers at high average powers. However, several such lasers must be operated simultaneously for even greater beam power. This generally significantly decreases the beam quality and the possibility of generating small foci. The achievable power density remains virtually constant.

To overcome this problem, Daneu et. al. (Opt. Lett., Vol. 25, No. 6, pp. 405-407) and Sanchez-Rubio (U.S. Pat. No. 6,192,062) proposed spectral multiplexing. This is an approach that uses multiple laser sources that are each operated at a different wavelength, so that they can be spatially overlapped by a suitably chosen element, usually a diffraction grating. Other Patent applications (e.g., WO 03/036766, WO 20/02091077) are based on this.

All these patents have a central dispersive element (prism or grating) that splits the resonator in two. On one side of the element, the various laser emissions are collinear, i.e., the beam cross section and emission direction are almost identical. On the second side of the element, the different beams are spatially dispersed by medium dispersion or diffraction, such that a separate laser of an appropriate wavelength can be operated under each direction. In general, this comprises lasers which have a feedback mirror in the common path, as this ensures that each gain region operates exactly at the appropriate wavelength, determined by the dispersion.

Common to these Patents is the fact that the spectral distance of the wavelengths to be multiplexed is defined by the dispersion and the geometry of the resonator. The dispersion in terms of "wavelength per angle" must be multiplied by the angle "emitter spacing divided by the distance to the dispersion element". For dense spectral multiplexing, large configurations are obtained or for a given resonator footprint and dispersion, a spectral step size typically greater than 1 nm results in the neighboring emitters. Furthermore, it is well known that most highly dispersive gratings only have a low diffraction efficiency and/or spectral acceptance and/or low damage thresholds, making the practical realization quite difficult.

EXPLANATION OF THE INVENTION

The spectral splitter device proposed by the invention is configured, therefore, as the optimum solution for achieving the above-mentioned aims, with the characterizing details that distinguish it being set forth in the final claims accompanying this description.

Specifically, what the invention proposes, as noted above, refers to a spectral splitter which, based on the principle of a Lyot filter, allows increasing the power density of a light source beam (for example a laser) from the linear superposition of each pair of beams combined by orthogonal polarization, through the use of birefringent and dispersive optical elements, for example calcite crystal with the necessary thickness to modify the wavelength in a controlled manner, causing both beams to have again the same linear polarization that allows their linear superposition, which, in turn, allows for a cascade repetition of the process, re-combining the linearly superimposed beams with other beams that have undergone the same process. The spectral splitter device comprises an optical assembly plate to achieve said result by including additional elements, such as an external resonator that provides a greater cavity and a specific resonance condition, depending on each need, on the output beam obtained.

For this purpose, and more specifically, the device that the invention proposes is a spectral splitter for splitting an initial light beam into more than two light beams, comprising essentially:

a first polarization beam splitter, which divides said light into two orthogonally polarized beams;

two optical elements, passed through respectively by the aforesaid two polarized beams; and a second and a third polarization beam splitter, which, in turn, divides the two polarized light beams into four respective output beams, each optical element being birefringent and the birefringence of both elements being wavelength dependent.

Furthermore, in the preferred embodiment, the light of the obtained output light beams mutually have at least one of the orthogonal polarization states or different wavelengths.

Likewise, in a preferred embodiment of the device of the invention, the initial light beam passes through a prior birefringent dispersive optical element before entering the first polarization beam splitter and, optionally, also passes through a prior polarization beam splitter before entering the first polarization beam splitter.

Furthermore, in the preferred embodiment, the initial light beam passes through a partially reflecting mirror before entering said prior polarizing beam splitter or said prior birefringent optical element, respectively.

Optionally, also at least one of the four output beams passes through a third optical element that is birefringent and/or dispersive.

On the other hand, it should be noted that, optionally, the spectral splitter device can act as a beam combiner when used as described above with an inverse beam path.

In such a case, the device comprises more than one individual light source, preferably lasers or a laser gain means, as light beams to be combined, with said individual light sources being able to obtain feedback from the partially reflecting mirror.

In any case, the spectral splitter device of the invention is configured as a plate comprising an individual mutual control means of the optical delay and/or dispersion of the first and second optical elements and, if applicable, of the prior optical element.

In the preferred embodiment, each individual optical element comprises birefringent dispersive crystals of integer multiples and of a basic thickness, and an additional phase delay comprising any one or a combination of:

a single or a combination of multiple retarder plates supports for individual tilting of the optical elements for delay adjustment Babinet-Soleil wedges a liquid crystal element with a delay controlled by its manufacturing process or an electric field.

More particularly, in the preferred embodiment, each individual optical element comprises at least two parts with a slight wedge, so that the effective thickness can be adjusted by moving the two parts with respect to each other.

Furthermore, preferably, the relative optical delay is carried out using fewer physical elements than conceptually necessary and where at least one is passed through more than once.

Finally, it should be noted that, in the preferred embodiment, the light source(s) may be a laser, semiconductor laser with or without low reflectivity, LED, laser bar, bar stack.

In any case, the light sources are a matrix and some of the polarizers are displacers.

DESCRIPTION OF THE DRAWINGS

To complement the description being made and in order to assist in a better understanding of the characteristics of the invention, this description is accompanied, as an integral part of the same, by drawings in which the following has been represented for illustrative and non-limiting purposes:

FIGS. 4 and 5. show two perspective views of an embodiment example of the assembly of a laser diode, with passive cooling and active cooling respectively, as an example of the light source comprising the spectral divider device object of the invention, showing its general configuration.

FIGS. 6 and 7 show perspective views of the laser diodes with passive cooling and active cooling, shown in FIGS. 1 and 2, in this case represented on a base using water as the cooling medium.

And figure number 10. shows a perspective view of an example of the mounting of the optical element on an inclined support.

PREFERRED EMBODIMENT OF THE INVENTION

In view of the aforementioned figures, and in accordance with the numbering adopted, it can be appreciated therein a non-limiting embodiment example of the spectral splitter device of the invention, more specifically an example as a laser optical device, which comprises what is indicated and described in detail below.

Figure 1:
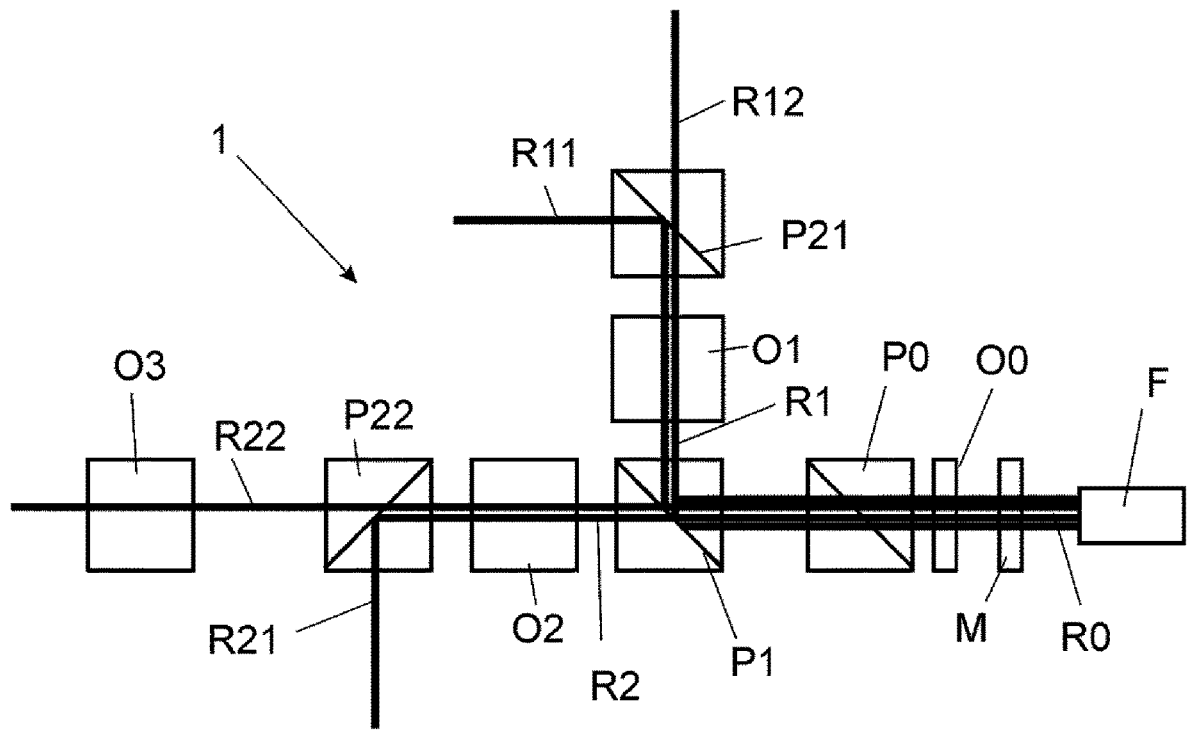
FIG. 1. shows a schematic representation of an example of implementation of the spectral splitter device, showing the main parts and elements it comprises, as well as its arrangement.
Figure 2:
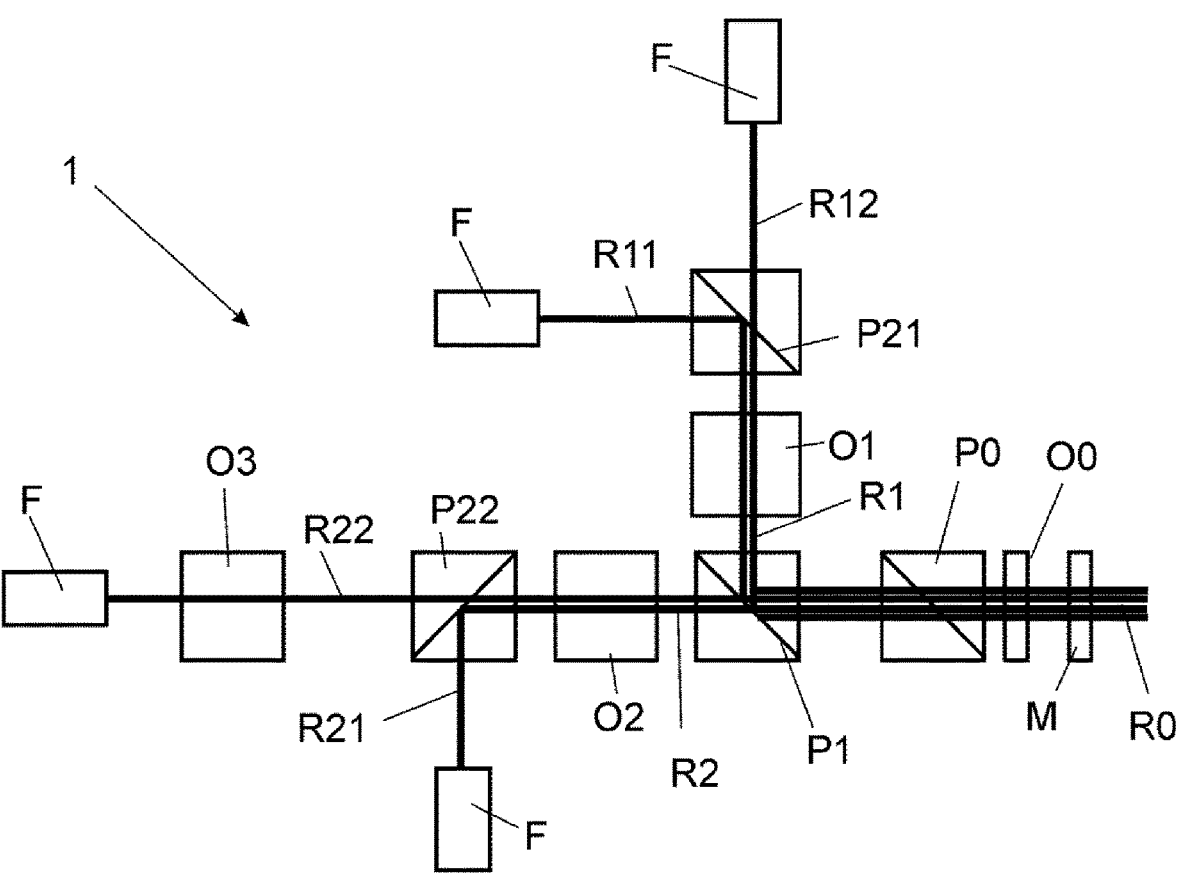
FIG. 2. shows a schematic representation of the spectral splitter device, in this case implemented as a beam combiner, showing the arrangement of its parts.

Thus, as seen in FIG. 1, the spectral splitter device (1) of the invention for transforming an initial light beam (R0), coming from a light source (F), into more than two light beams, essentially comprises:

a first polarization beam splitter (P1), which splits said initial light beam (R0) into two orthogonally polarized beams (R1 and R2);

two optical elements (O1 and O2), passed through respectively by the above two orthogonally polarized beams (R1 and R2); and

a second and a third polarization beam splitter (P21 and P22), which, in turn, split the two orthogonally polarized light beams (R1 and R2) into four respective output beams (R11 and R12) and (R21 and R22), with each of these optical elements (O1 and O2) being birefringent and the birefringence of both elements being wavelength dependent.

Preferably, the light from the four output light beams (R11 and R12) and (R21 and R22) obtained mutually has at least one of the orthogonal polarization states or different wavelengths.

Preferably, the initial light beam (R0) passes through a prior birefringent dispersive optical element (O0) before entering the first polarization beam splitter (P1).

Alternatively, the initial light beam (R0) passes through a prior polarization beam splitter (P0) before entering the first polarization beam splitter (P1).

And, optionally, the initial light beam (R0) passes through a partially reflecting mirror (M) before entering the aforementioned prior polarization beam splitter (P0) or the prior birefringent optical element (O0).

In any case, preferably, at least one of the four output beams (R11 and R12) and (R21 and R22) passes through a third optical element (03) which is birefringent and/or dispersive.

It should be noted that, optionally, in one embodiment, the described spectral splitter device is capable of being applied as a beam combiner when used as described above with a reverse beam path, that is, obtaining the sum of the two pairs of beams (R11 and R12) and (R21 and R22) generated by more than one individual light source (F) and combining them into a single beam (R0).

In such a case, for obtaining the beams (R), the device comprises more than one individual light source (F), preferably lasers or a laser gain means, which generate the light beams to be combined. Said individual light sources are able to obtain feedback from the partially reflecting mirror (M).

In the preferred embodiment, the spectral splitter device (1) of the invention is implemented with at least one phase delay plate for the individual mutual control of the optical delay and/or dispersion of the first and second optical elements (O1, O2) and, if applicable, of the prior optical element (O0).

Preferably, said plate is a special type of phase plate called a quarter-wave plate.

In the preferred embodiment, each individual optical element (O1, O2, O0) comprises birefringent dispersive crystals of integer multiples and of a basic thickness, and an additional phase delay comprising any one or a combination of:

a single retarder plate or a combination of multiple retarder plates supports for individual tilting of the optical elements for delay adjustment Babinet-Soleil wedges a liquid crystal element with a delay controlled by its manufacturing process or an electric field.

More particularly, in the preferred embodiment, each individual optical element comprises at least two parts with a slight wedge, so that the effective thickness can be adjusted by moving the two parts with respect to each other.

Furthermore, preferably, the relative optical delay is carried out using fewer physical elements than conceptually necessary and where at least one is passed through more than once.

It should be noted that the light source(s) (F) can be a laser, semiconductor laser with or without low reflectivity, LED, laser bar, bar stack.

In addition, light sources (F) can be both either point or matrix and some of the polarizers are displacers.

Figure 3:
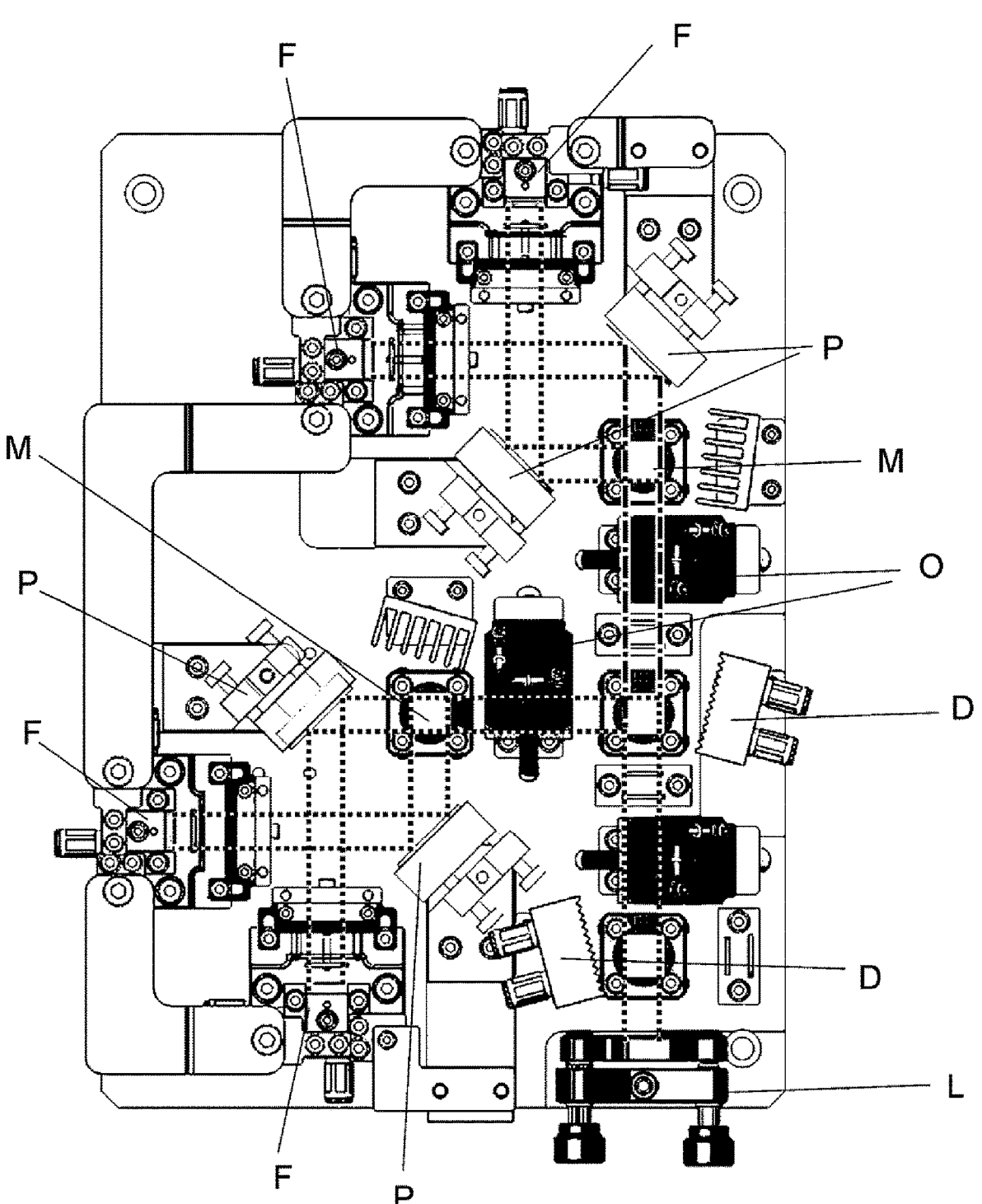
FIG. 3. shows a top view of an embodiment example of the device as a beam combiner on an optical plate, showing the main parts and elements it comprises, as well as their arrangement, the different light beams being represented by dotted lines.

Referring to FIG. 3, an example of implementation of the device of the invention on a plate (3) can be seen, in particular, an example in which four beams are combined in an output lens (L), where it can be seen how, in addition, heat sinks (D) are included.

Referring to FIGS. 3 to 9, an example of the light source (F) can be seen, specifically a semiconductor laser diode that is either passively cooled (FIG. 4) without water inside the assembly on a base (2) that has the cooling system, or actively cooled (FIG. 5) with two water channels that cool the diode.

FIGS. 6 and 7 show both options of the diode as a light source (F) in its two versions, passively and actively cooled, respectively, once mounted on the base (2) that uses water as the cooling medium.

Said base (2) is used to assemble the diode or light source (F) to the end plate (3) and is fitted with water connections (4) to fit the tubes and cool the system. The actively cooled mount shown in FIG. 7 has more robust connections to allow higher currents, although the height of both options is the same.

Figures 8, 9, 10:
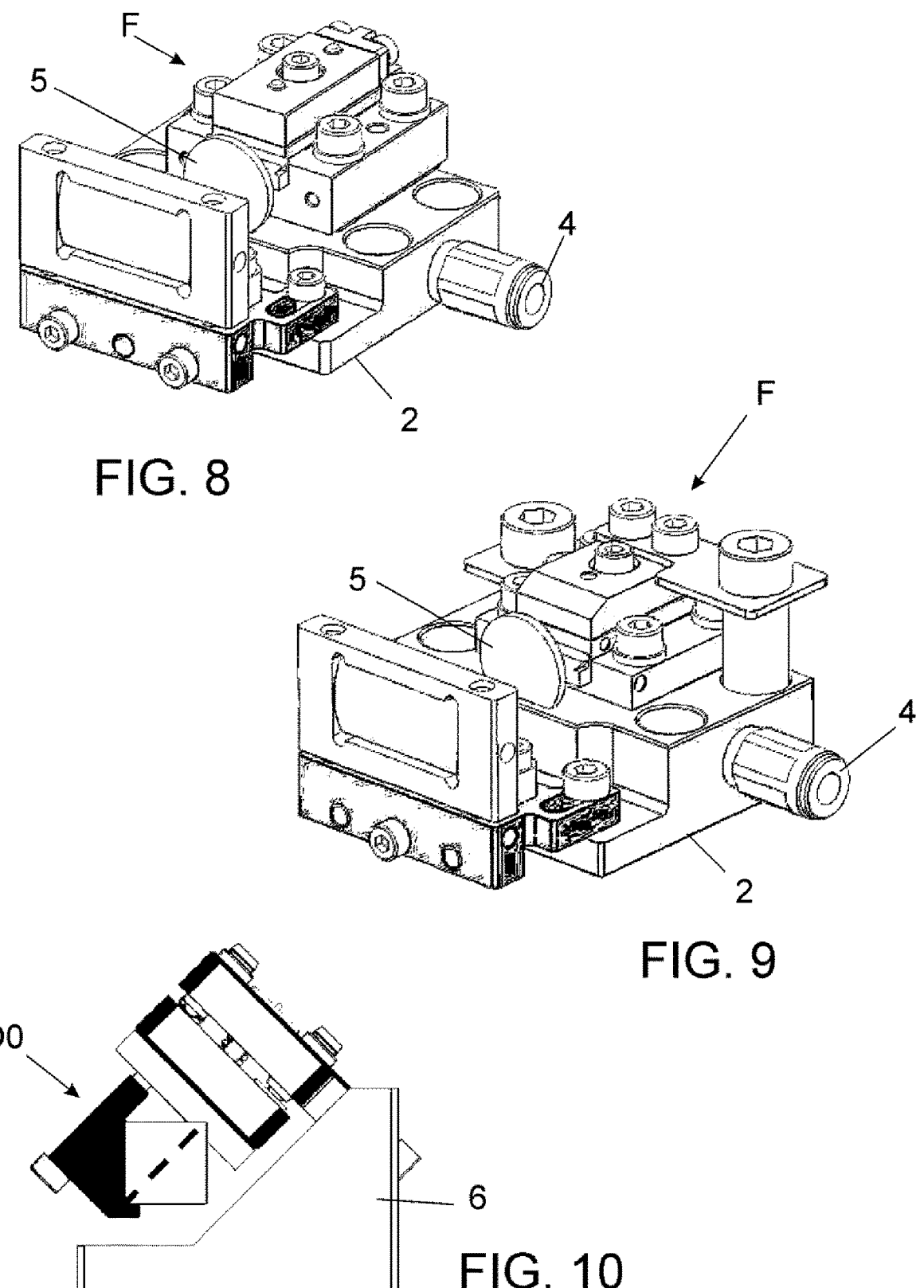
FIGS. 8 and 9 each show perspective views of the laser diodes with passive cooling and active cooling, mounted on their base using water as the cooling medium and shown in the preceding figures, in this case including their respective circular lens adjustments.

FIGS. 8 and 9 show the assembly of both options of the light source (F), with a passive and an active cooling system respectively, once the circular lenses (5) have been coupled, the adjustment of which does not vary as it is identical.

And finally, it can seen in FIG. 10 how, preferably, the optical element (O), which preferably is a birefringent and/or dispersing crystal, for example calcite, is mounted on a support (6) inclined at 45°.

Having sufficiently described the nature of the present invention as well as its implementation, it is considered unnecessary to extend the explanation thereof so that any person skilled in the art may understand its scope and the advantages derived therefrom.

The invention claimed is:

1. A spectral splitter device for transforming an initial light beam from a light source into a pair of light beams by incoherent division, the spectral splitter device comprising: a first polarization beam splitter that splits the initial light beam into the pair of light beams, the pair of light beams orthogonally polarized and incoherent; a pair of optical elements passed through respectively by the pair of light beams; and a second polarization beam splitter and a third polarization beam splitter which in turn split the pair of light beams into four respective output beams, wherein each of said pair of optical elements is birefringent such that the birefringence of the pair of optical elements is dependent on a wavelength of the pair of light beams.

2. The spectral splitter device of claim 1, wherein a light from the four respective output beams has different spectral components.

3. The spectral splitter device of claim 2, wherein the initial light beam passes through a birefrigent and dispersive optical element prior to passing to said first polarization beam splitter.

4. The spectral splitter device of claim 2, wherein the initial light beam passes through a pre-polarization beam splitter prior to passing to said first polarization beam splitter.

5. The spectral splitter device of claim 3, wherein the initial light beam passes through a partially reflecting mirror prior to passing to the birefrigent and dispersive optical element.

6. The spectral splitter device of claim 4, wherein the initial light beam passes through a partially reflecting mirror prior to passing to the pre-polarization beam splitter.

7. The spectral splitter device of claim 1, wherein at least one of the four respective output beams passes through a third optical element, the third optical element being birefrigent.

8. The spectral splitter device of claim 1, wherein at least one of the four respective output beams passes through a third optical element, the third optical element being dispersive.

9. The spectral splitter device of claim 1, wherein the light source is more than one individual light source that generates a plurality of beams that combine into a single beam when a reverse path is applied to the plurality of beams.

10. The spectral splitter device of claim 9, wherein the more than one individual light source obtains the reverse path from a partially reflecting mirror.

11. The spectral splitter device of claim 1, wherein further comprising:
a controller that controls an optical delay or dispersion of said pair of optical elements.

12. The spectral splitter device of claim 11, wherein each of said pair of optical elements comprises birefrigent dispersive crystals of integer multiples of a basic thickness.

13. The spectral splitter device of claim 12, wherein each of said pair of optical elements has a phase delay comprising:
at least one retarder plate.

14. The spectral splitter device of claim 12, wherein each of said pair of optical elements has a phase delay comprising:
a support cooperative with each of said pair of optical elements and adapted to tilt the optical element in order to adjust the phase delay.

15. The spectral splitter device of claim 12, wherein each of said pair of optical elements has a phase delay comprising:
a liquid crystal element having a delay formed therein.

16. The spectral splitter device of claim 1, wherein each of said pair of optical elements has at least a pair of parts with a wedge, the wedge adapted to adjust the pair of parts by moving the pair of parts with respect to each other.

17. The spectral splitter device of claim 1, wherein the light source is selected from a group consisting of laser diode, a semiconductor laser, a light-emitting diode, a laser bar, a bar stock and combinations thereof.

18. The spectral splitter device of claim 9, wherein the more than one individual light source is a matric of light sources.

19. The spectral splitter device of claim 1, wherein at least one of said first polarization beam splitter and said second polarization beam splitter is a displacer.

* * * * *